United States Patent
Warnan et al.

(10) Patent No.: US 11,906,673 B2
(45) Date of Patent: Feb. 20, 2024

(54) SONAR SYSTEM

(71) Applicant: THALES, Courbevoie (FR)

(72) Inventors: François Warnan, Brest (FR); Mathieu Bodilis, Brest (FR)

(73) Assignee: THALES, Courbevoie (FR)

( * ) Notice: Subject to any disclaimer, the term of this patent is extended or adjusted under 35 U.S.C. 154(b) by 261 days.

(21) Appl. No.: 17/286,767

(22) PCT Filed: Sep. 23, 2019

(86) PCT No.: PCT/EP2019/075557
§ 371 (c)(1),
(2) Date: Apr. 19, 2021

(87) PCT Pub. No.: WO2020/083587
PCT Pub. Date: Apr. 30, 2020

(65) Prior Publication Data
US 2021/0373139 A1    Dec. 2, 2021

(30) Foreign Application Priority Data

Oct. 22, 2018 (FR) ....................... 1801116

(51) Int. Cl.
*G01S 7/521* (2006.01)
*B63B 21/66* (2006.01)
*B63G 8/42* (2006.01)

(52) U.S. Cl.
CPC .............. *G01S 7/521* (2013.01); *B63B 21/66* (2013.01); *B63G 8/42* (2013.01)

(58) Field of Classification Search
CPC ......... G01S 7/521; B63B 21/66; B63B 27/36; B63G 8/42
See application file for complete search history.

(56) References Cited

U.S. PATENT DOCUMENTS

| | | | |
|---|---|---|---|
| 8,813,669 B2 * | 8/2014 | Race | H01Q 1/04 |
| | | | 114/244 |
| 8,985,904 B1 * | 3/2015 | Canavan | G01S 7/521 |
| | | | 405/158 |

(Continued)

FOREIGN PATENT DOCUMENTS

| | | |
|---|---|---|
| DE | 10 2015 116 750 A1 | 4/2017 |
| EP | 0 516 511 A1 | 12/1992 |

(Continued)

OTHER PUBLICATIONS

Murdoch, et al., "The joint Saclantcen/USA towed vertically directive source—TVDS", Proceedings of the Undersea Defence Technology 1995 conference and exhibition, 2006.

*Primary Examiner* — Yuqing Xiao
*Assistant Examiner* — Christopher Richard Walker
(74) *Attorney, Agent, or Firm* — BakerHostetler

(57) ABSTRACT

A sonar system includes a towfish comprising a first body linked to a second body, the first body being elongate along a longitudinal axis and comprising a plurality of acoustic transmitters distributed along the longitudinal axis, the sonar system comprising a cable linked to the second body and via which a surface carrier ship is intended to tow the towfish, the first body being mounted to pivot, with respect to the second body, about an axis of rotation so that, the first body can switch, by pivoting with respect to the second body about the axis of rotation, from an operational position to a capture position; the axis of rotation being substantially an axis of movement of the towfish, the longitudinal axis being substantially vertical in the operational position of the first body and being substantially horizontal in the capture position of the first body, when the towfish is totally submerged and towed by the carrier ship.

10 Claims, 9 Drawing Sheets

(56) References Cited

U.S. PATENT DOCUMENTS

| | | | | |
|---|---|---|---|---|
| 9,001,623 | B1* | 4/2015 | Sharp | G01S 7/521 |
| | | | | 114/244 |
| 9,791,862 | B1* | 10/2017 | Connor | G05D 1/0875 |
| 10,232,915 | B2* | 3/2019 | Jourdan | B63B 35/40 |
| 11,192,614 | B2* | 12/2021 | Peleg | B63C 7/16 |
| 2017/0291666 | A1* | 10/2017 | Jourdan | B63B 21/66 |

FOREIGN PATENT DOCUMENTS

| | | |
|---|---|---|
| FR | 2 925 231 A1 | 6/2009 |
| WO | 2017/035660 A1 | 3/2017 |

* cited by examiner

SONAR SYSTEM

CROSS-REFERENCE TO RELATED APPLICATIONS

This application is a National Stage of International patent application PCT/EP2019/075557, filed on Sep. 23, 2019, which claims priority to foreign French patent application No. FR 18/01116, filed on Oct. 22, 2018, the disclosures of which are incorporated by reference in their entirety.

FIELD OF THE INVENTION

The invention relates to the field of the sonar systems of the type comprising a so-called active part intended to be towed by a surface carrier ship via a cable. The active part comprises an acoustic wave transmission antenna that is elongate along a longitudinal axis of the antenna intended to extend substantially vertical in operation so as to transmit acoustic waves primarily in a horizontal plane. The sonar system conventionally comprises a receiving antenna that allows echoes from the acoustic waves transmitted by the transmission antenna to be detected.

BACKGROUND

This type of antenna generally has a length of several meters and is therefore very bulky, which means having to design large openings at the rear of the carrier ship to allow these antennas to be retrieved. Furthermore, a recess often has to be made in the main deck in order to be able to store the transmission antenna which is too long to be housed between the main deck and the top deck.

A solution represented in FIG. 9 is known, in which the active part is of the towed towfish type 100. This towfish 100 comprises the transmission antenna 101 and a heavy body 102, that is to say one with negative buoyancy. The towfish 100 is hydrodynamically profiled, balanced and linked to the cable 104 so that the antenna is vertical, as represented in FIG. 9, when it is towed by the ship. The heavy body 102 is situated in front of the transmission antenna 101 during the towing and the cable 104 pulls the towfish from above the heavy body 102.

To be able to retrieve this towfish 100, initially towed, onboard a carrier ship, the sonar system comprises a winch allowing the cable to be pulled in and paid out, a retrieval arm installed onboard the carrier ship and having the form of a boom at the end of which there is arranged an end stop passed through by the cable. In order to retrieve the towfish onboard the ship, the end stop is positioned just above the surface of the water. The retrieval phase comprises a capture phase, during which the winch pulls in the cable, the cable raises the towfish whose body then comes to bear against the end stop. The end stop then blocks the upward vertical movement of the towfish with respect to the arm. The arm is then tilted while keeping the cable taut to lift the towfish while keeping it blocked against the end stop, then advanced toward the front of the carrier ship to return the towfish into the carrier ship by passing it through an opening formed in the hull of the boat. The towfish is then stored inside the carrier ship.

During the retrieval of the towfish, from capture to storage, the transmission antenna always remains vertical.

The capture of the towfish 100 is not however without difficulties, especially when the sea is rough. During capture, the end stop being just above the surface of the water and the transmission antenna being vertical, approximately half of the antenna is out of the water. Now, the removal from the water of half of the antenna modifies the buoyancy exerted on the towfish which has the effect of altering the trim of the towfish which can tilt backward which can make the correct capture of the towfish and its retrieval onboard the ship and its storage more difficult and random.

Breaking waves and breakers can also strike the above-water part of the transmission antenna and modify the list of the towfish and have similar consequences.

Moreover, the coupling of a pendulum movement linked to the cable length (movement excited by the movements of the carrier ship and the eddies from the propeller or propellers), yaw movement and list movement renders the good capture of the towfish more random. This movement is known to airplane pilots as "Dutch roll" and it can be compared to the movement of a ball in a gutter which can impede the capture phase. These random movements can prevent the towfish from coming into line with the end stop which can hamper its capture. The towfish can, for example, remain blocked on one of the sides of the end stop or behind the latter.

In these situations, the antenna is threatened by violent impacts which can damage it. To obviate these critical situations, the cable has to be relaxed sufficiently and a new capture attempted.

Other types of sonar systems are known with large vertical antenna such as, for example, those disclosed in the documents U.S. Pat. No. 9,001,623 and WO 2017/035660, in which the transmission antenna is linked to the cable via a body. These systems are configured so that the antenna extends vertically when it is towed by a cable. The antenna can pivot with respect to the body about a horizontal axis at right angles to the axis of movement of the antenna towed in the water so as to extend longitudinally overall parallel to the axis of the cable in a capture configuration. These systems comprise retrieval means which allow the transmission antenna to be brought back onboard the carrier ship only by hauling in the cable, the cable then pulling the towfish toward the ship along the axis of the cable.

In that way, when the antenna passes through the opening formed in the ship, its limited bulk in a plane transversal to the axis of the ship allows the size of this opening to be limited. These devices present the drawback of exposing the antenna, which is not blocked but simply non-rigidly taut between two cables, to the breakers in case of heavy seas when it leaves the water which can compromise its passage through the opening and expose it to impacts. The intervention of an operator to direct the retrieval of the antenna is then necessary but dangerous. Moreover, stowing such a transmission antenna extending longitudinally along the axis of the ship once embarked onboard the ship, requires a very long carrier ship capable of offering an aft space with a free volume of great length. Moreover, this orientation is unfavorable to the stowage of the antenna around a drum hauling in all the cable and the antenna without separating the antenna from the cable. Furthermore, since the horizontal surfaces having a horizontal tail unit function when the antenna is vertical do not retain their tail unit function when the antenna extends overall longitudinally along the axis of the cable. These surfaces become a brake to the movement of the antenna which loses its hydrodynamic profile. In the sonar system of the document U.S. Pat. No. 9,001,623 the transmission antenna is linked to the cable via a body of great length in which the antenna is housed and which is profiled so as to limit this brake. This body also serves to protect the antenna during its retrieval onboard the ship. However, the stowing of a body of great length onboard a ship is difficult and means having to provide long ships. Moreover, this body limits the accessibility to the transmission antenna for its maintenance.

SUMMARY OF THE INVENTION

One aim of the invention is to limit at least one of the abovementioned drawbacks.

To this end, the subject of the invention is a sonar system comprising a towfish comprising a first body linked to a second body, the first body being elongate along a longitudinal axis and comprising a plurality of acoustic transmitters distributed along the longitudinal axis. The sonar system comprises a cable linked to the second body and via which a surface carrier is intended to tow the towfish. The first body is mounted to pivot, with respect to the second body, about an axis of rotation so that, the first body can switch, by pivoting with respect to the second body about the axis of rotation, from an operational position to a capture position. When the towfish is totally submerged and towed by the carrier ship, the axis of rotation is substantially an axis of movement of the towfish, the longitudinal axis of the first body is substantially vertical in the operational position and substantially horizontal in the capture position.

Advantageously, the axis of rotation extends substantially horizontally when the towfish totally is towed by the carrier ship.

Advantageously, the cable is linked to the second body so that the cable pulls the towfish from above the second body.

Advantageously, the axis of rotation is situated substantially equidistant between two longitudinal ends of the first body.

Advantageously, the body is substantially symmetrical with respect to the vertical plane containing the axis of rotation and the cable and with respect to a substantially horizontal plane containing the axis of rotation, the first body being in the operational position. Advantageously, that is obtained when the towfish is totally submerged and towed by the ship.

Advantageously, a center of gravity of the first body is situated on the axis.

Advantageously, the first body comprises a first assembly of at least one tail unit that is vertical and that has a stabilizer function when the first body is in the operational position and at least one second assembly of at least one tail unit that is horizontal when the first body is in the operational position. Advantageously, that is obtained when the towfish is totally submerged and towed by the ship.

Advantageously, the towfish has a negative buoyancy.

Advantageously, the sonar system comprises handling means comprising a winch allowing the cable to be pulled in and paid out and an arm comprising an end provided with an end stop, the arm being able to be maintained in a receiving position with respect to the carrier ship, in which the end stop is situated above the surface of the water at a first height with respect to the surface of the water, the end stop being passed through by the cable so that the second body can come to bear on the end stop when the cable is being hauled in so as to block the upward movement of the second body with respect to the arm, the arm being movable with respect to the carrier ship so as to be able to be in a stowage position with respect to the carrier ship in which the towfish is embarked onboard the carrier ship, the second body being in abutment against the end stop.

The sonar system advantageously comprises the carrier ship. The carrier ship is advantageously linked to the towfish via the cable.

BRIEF DESCRIPTION OF THE DRAWINGS

Other features, details and advantages of the invention will emerge on reading the description given with reference to the attached drawings given by way of example and which represent, respectively.

From one figure to another, the same elements are identified by the same references.

DETAILED DESCRIPTION

Figure 1:
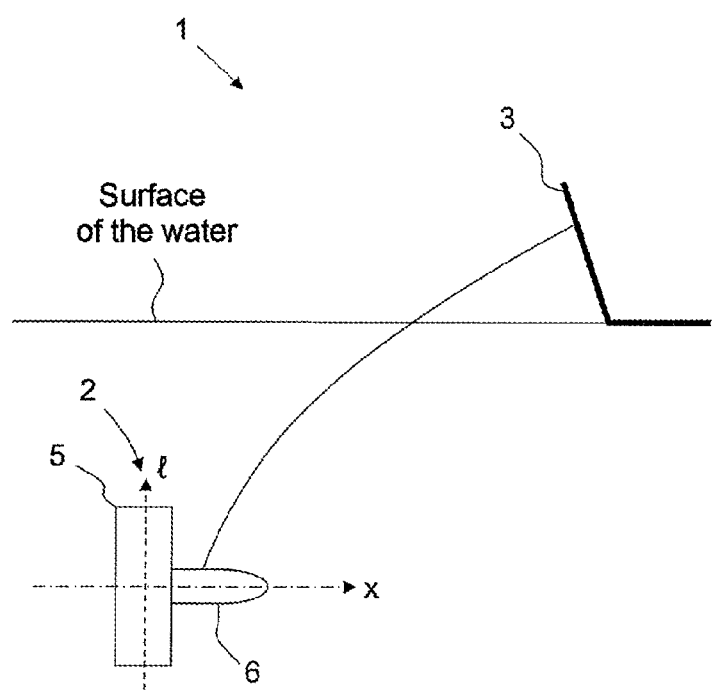
FIG. 1 schematically represents a sonar system according to the invention.

FIG. 1 represents an example of sonar system 1 according to the invention.

This sonar system 1 comprises a towfish 2, intended to be towed by a surface carrier ship 3 via a cable 4. The surface carrier ship 3 is intended to move around on the surface of the water, for example only on the surface of the water. When the carrier ship 3 tows the towfish 2, the carrier ship 3 advances at a non-zero speed forward along the axis of the ship. The towfish 2 is towed behind the carrier ship 3 and also advances forward.

The towfish 2 comprises a first body 5 linked to a second body 6 linking the first body 5 to the cable 4.

The body 6 is linked to the cable 4 via attachment means 40 allowing the cable 4 to be linked to the body 6.

The towfish 2 has a negative buoyancy. This negative buoyancy is advantageously for submerging the towfish at depth at the low towing speeds.

The first body 5 has an elongate form along a longitudinal axis I.

Figure 2:
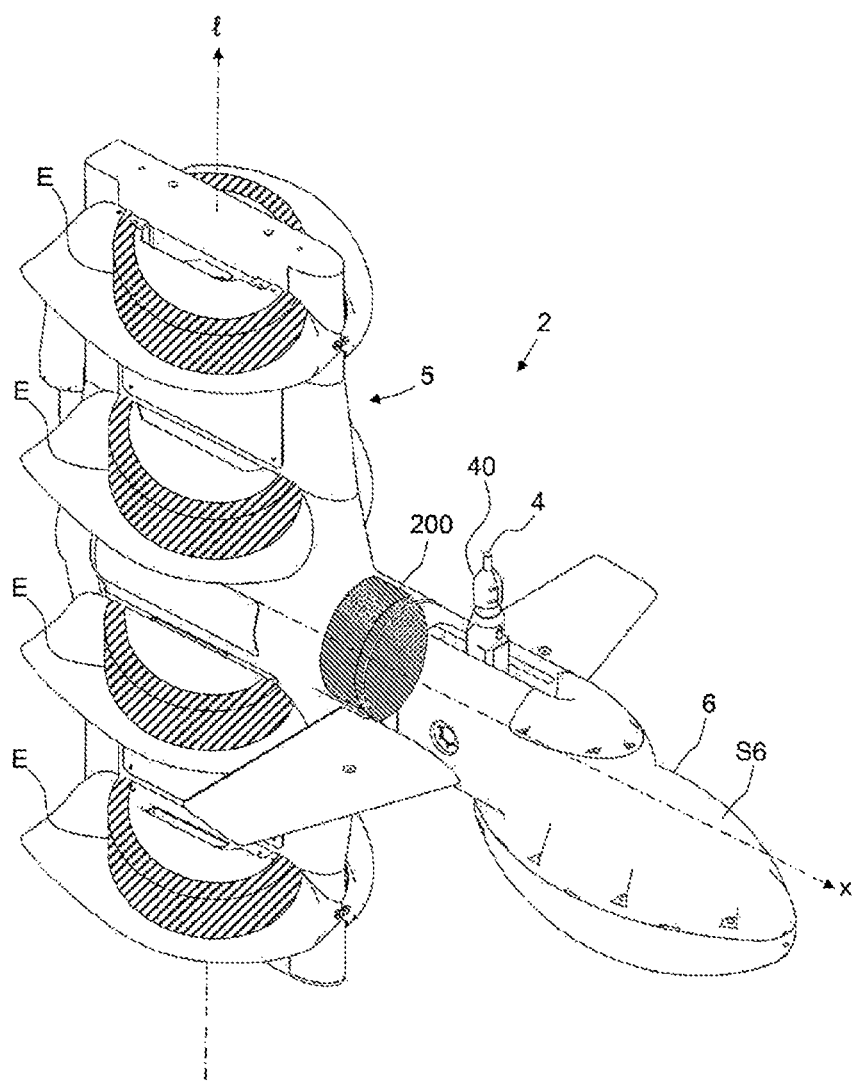
FIG. 2 schematically represents an example of a towfish of a sonar system according to the invention in which an actuator and transmitters are made visible by transparency, the towfish being in the operational position, FIG. 3 schematically represents an example of a towfish of a sonar system according to the invention, the towfish being in the operational position, FIG. 4 schematically represents the towfish of FIG. 3, in the capture position, FIG. 5 schematically represents, in perspective, the sonar system during a capture step, an arm of handling means being in a capture position, FIG. 6 schematically represents a side view of the sonar system of FIG. 5, FIG. 7 schematically represents, in perspective, the sonar system when the arm of FIG. 5 is in a transfer position, FIG. 8 schematically represents, in side view, the sonar system when the arm is in a stowage position, FIG. 9, already described, represents the towfish of the prior art.

The first body 5 comprises a plurality of acoustic transmitters E that are adjacent along the longitudinal axis I as is represented in FIG. 2. The acoustic transmitters E form, for example, an acoustic wave transmission antenna. The acoustic transmitters E have, for example, the form of a ring whose center passes through the axis I or of a tube of axis I.

The antenna and the acoustic transmitters E are intended to operate when the first body 5 is totally submerged. The first body 5 is then at a greater depth than the body 3.

Figure 3:
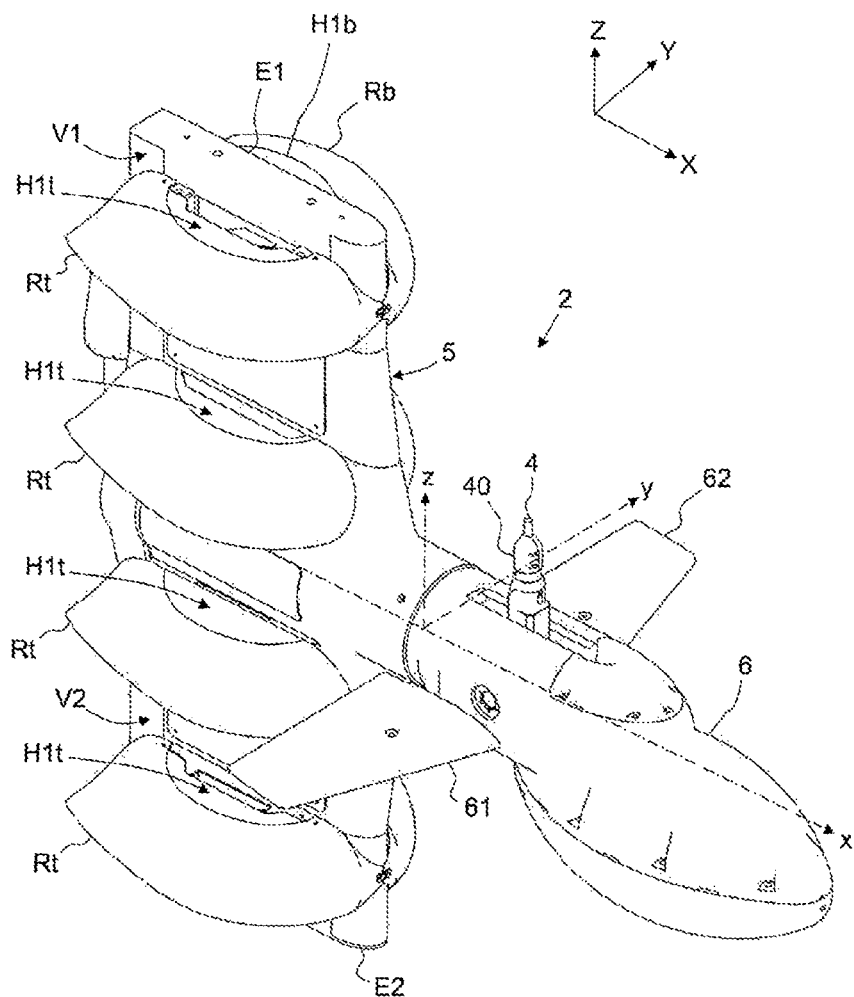
Figure 4:
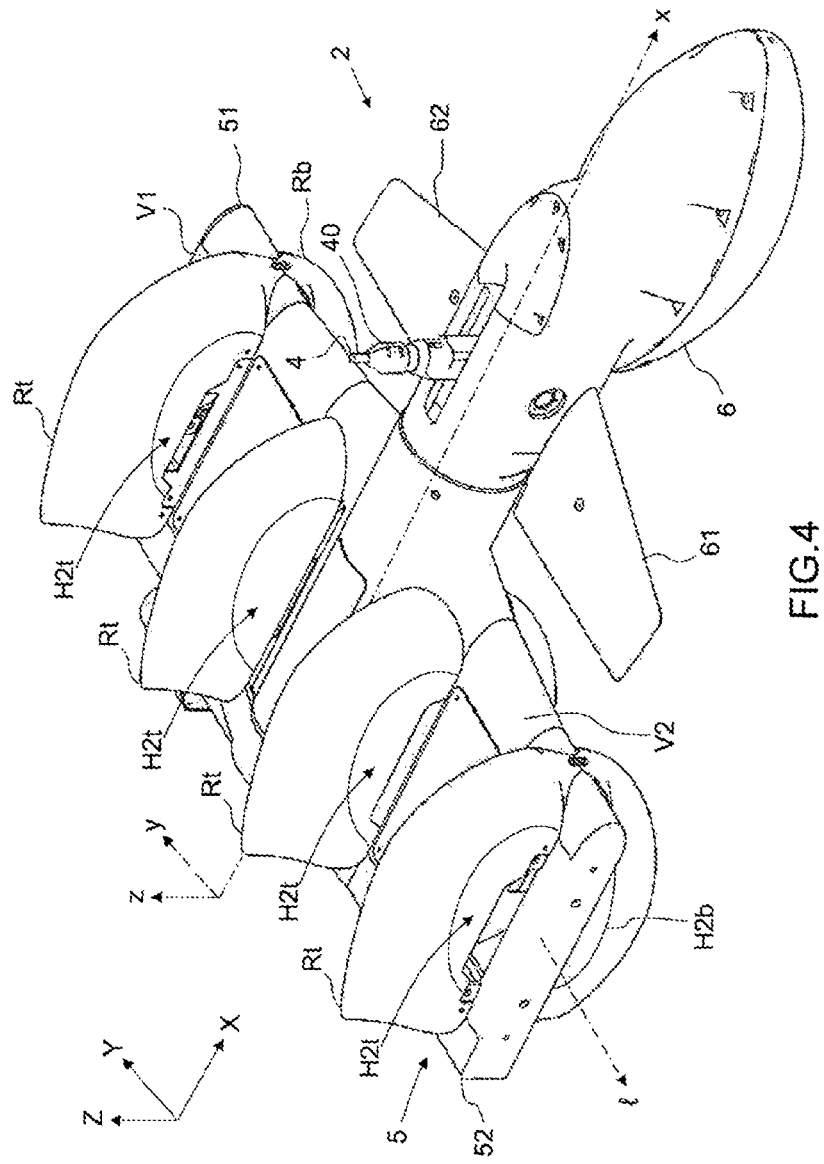

According to the invention, the first body 5 is mounted to pivot with respect to the second body 6 about an axis of rotation x integral to the second body 6 so that the first body 5 can occupy an operational position, that can be seen in FIGS. 1 and 3, and a capture position, that can be seen in FIG. 4, with respect to the second body 6. The first body 5 switches from the operational position to the capture position by rotation about the axis of rotation x with respect to the second body 6. These positions are angular positions of the first body 5 with respect to the second body 6 about the axis of rotation x.

Advantageously, the first body 5 is not deformed in the switch from the operational position to the capture position or takes the same form in both these positions.

The orthogonal reference frame x, y, z represented in FIGS. 3 and 4, is a reference frame linked to the second body 6 comprising three orthogonal axes x, y and z. The orthogonal reference frame X, Y, Z represented in FIGS. 3 and 4 is an orthogonal reference frame linked to the Earth, the axis Z being vertical and the axes X and Y defining the horizontal plane, the carrier ship 3 moving along the axis X.

The towfish 2 is hydrodynamically profiled, balanced and linked to the cable 4 so that, when the towfish 2 is totally submerged and towed by the ship 3 via the cable 4, the longitudinal axis I of the antenna in the operational position is oriented along the axis z which is then substantially vertical (oriented along the vertical axis Z of the Earth's reference frame) as represented in FIG. 3. The towfish 2 is also hydrodynamically profiled, balanced and linked to the cable 4 so that the axis of rotation x and the axis y are intended to extend substantially horizontally when the towfish 2 is totally submerged and towed by the carrier ship 3.

When the towfish 2 is totally submerged and towed by the carrier ship 3, the towfish 2 is at a greater depth than the carrier ship 3.

The axis of rotation x is the axis of movement of the towfish 2 when the towfish 2 is towed by the carrier ship 3.

The towfish 2 is hydrodynamically profiled, balanced and linked to the cable so that its axis of movement is substantially horizontal when the towfish 2 moves around at a predetermined depth. The towfish 2 moves at a predetermined depth when the length of the cable 4 separating the towfish from the winch is set and when the surface ship moves at a constant speed in a straight line. The axis of movement of the towfish 2 is therefore substantially parallel to the axis of movement of the carrier ship 3.

Advantageously, the first body 5 pivots by an angle of $\pi/2$ radians with respect to the second body 6, about the axis of rotation x, to switch from the operational position to the capture position.

The balancing of the towfish is defined by the distribution of the weights of the towfish.

As can be seen in FIG. 4, the longitudinal axis I is substantially horizontal when the first body 5 is in the capture position and the totally submerged towfish 2 is towed by the carrier ship 3.

The sonar system 1 also comprises an actuator allowing the first body 5 to be made to pivot with respect to the second body 6 about the axis x to switch the first body 5 from the operational position to the capture position and vice versa.

The towfish 2 of which the first body 5 occupies the capture position when it approaches the carrier ship 3 thus has a limited vertical bulk which allows an opening 8 of limited height on the axis Z to be formed, in the hull of the carrier ship 3. Now, it is easier to form, in the hull of a carrier ship, an opening of large dimension on the axis y than an opening of great height which can be required to pass through the deck of a ship which requires the structure of the ship to be modified, for example by forming an opening in the deck (it is almost impossible to construct a large door heightwise if the boat is not designed from the outset with this constraint).

Moreover, this solution allows the towfish 2 to be easily stored. In fact, the first body 5 having a limited vertical bulk, it is not necessary to form a recess on the deck of the boat.

When the first body 5 is in the capture position, once the towfish 2 is retrieved onboard the ship, the towfish 2 has a limited length along the longitudinal axis of the carrier ship 3 which is beneficial for the storage of the towfish. It is in fact easier to store a large towfish of limited length on the axis x than a towfish of greater length on the axis x and of small width on the axis y. The invention is therefore particularly advantageous, from the point of view of the compactness of the antenna on the longitudinal axis of the carrier, for the storage of very long antennas.

The folding back of the first body 5 on the axis y allows easy access to the latter for its maintenance.

By making the first body 5 switch from the operational position to the capture position before retrieving the towfish 2 onboard the ship 3, this solution allows the height of the towfish 2 on the axis Z, more particularly the height of its submerged portion, to be drastically reduced. The random forces (linked to the breakers) which are exerted on it and which destabilize it are then considerably reduced. That favors the retrieval of the towfish 2 and limits the risk of strikes between the towfish 2 and the ship 3 in the phase of retrieval of the towfish in heavy sea situations.

Figure 9:
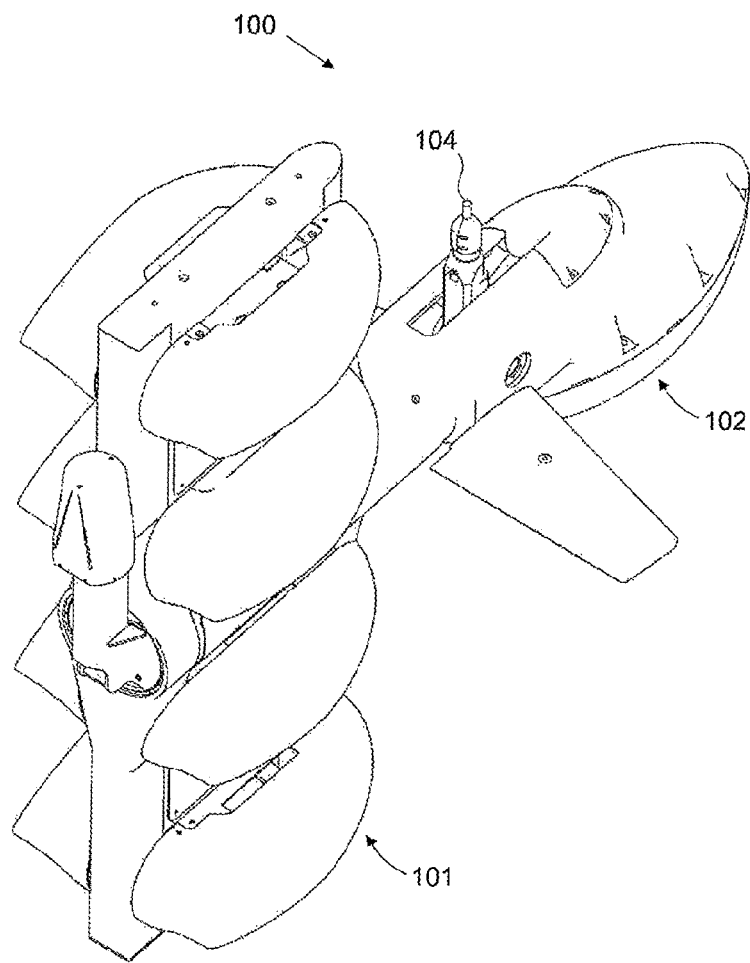

The proposed solution is also compatible with a solution of the prior art, of the type of that represented in FIG. 9, comprising handling means for the towfish 2 of the type allowing the towfish 2 to be captured prior to its retrieval onboard the carrier ship 3. This type of sonar system allows its retrieval onboard the ship to be facilitated by limiting the risks of impacts and operator interventions.

The first body 5 can have a length of several meters, of the order of 2 meters or more, to obtain the acoustic performance levels that allow new, increasingly rapid and silent submarine threats to be detected. These large antennas are not necessarily heavier but they do have greater quadratic moments (or polar inertias) which slows down the movements of the towfish but renders them irresistible.

The invention allows, during the towfish capture phase, the matrix of the inertias of the towfish to be modified to the profit of the stability of the towfish. In fact, by swiveling the antenna so that its longitudinal axis extends along the axis y, the inertia of the towfish on Z is considerably increased (by reducing its height on Z). The great surface moment on Z has no undesirable effect during routine submerged navigation but proves a nuisance at the time of retrieval of the towfish when the length of the cable allows a pendulum frequency close to the frequency on the axis Z to be excited by coupling. The towfish is therefore a long way from being able to navigate in a straight line and the difficult capture phase may go badly.

By swiveling the antenna of the towfish on Y, the moment of the surfaces on the Z is considerably reduced, which is beneficial for the yaw stability and therefore for the alignment with any possible towfish handling means allowing the towfish to be captured before its entry into the ship and/or for the alignment with the opening 8. The mean inertia on Y is also reduced. The advantage is to have a towfish which is barely or no longer at all stressed on Y (by the breakers), is highly hydrodynamically damped on Y since all the antenna is in the water, and which exhibits a reduced inertia. The assembly means that there is almost no longer any list and roll movement.

The actuator 200 is advantageously able to block the first body 5 in the operational and capture positions. For example, the actuator 200 is a rotary motor.

In a variant, the sonar system comprises blocking means that allow the first body 5 to be held with respect to the second body 6 in the capture and operational positions. The actuator can ensure the switch from the operational position to the capture position, and advantageously, but not necessarily, vice versa, when the towfish is submerged and towed by the surface carrier ship 3.

The second body 6 is linked to the cable 4 so that the cable 4 pulls the second body 6 from above during the towing of the towfish 2. In other words, the cable 4 is fixed onto the part S6 of the second body 6 or linked to that part which is intended to be turned toward the surface of the water during the towing of the towfish 2, that is to say on the back of the second body 6.

Advantageously, the second body 6 is situated in front of the first body 5 along the axis of movement of the towfish 2 in the direction of the movement of the towfish during the towing by the carrier ship 3.

The sonar system 1 also comprises handling means 7 that allow the towfish 2, initially towed by the carrier ship 3, to be retrieved onboard the carrier ship 3, by making it pass through an opening 8 formed in the hull of the ship, and, vice versa, to place it in the water when it is initially embarked onboard the ship 7.

The handling means comprise a winch 70 embarked onboard the ship 3 and that allows the cable 4 to be hauled in so as to allow the towfish 2 to be pulled toward the ship 3 and that allows the cable 4 to be paid out to distance the towfish from the carrier ship 3.

Figure 5:
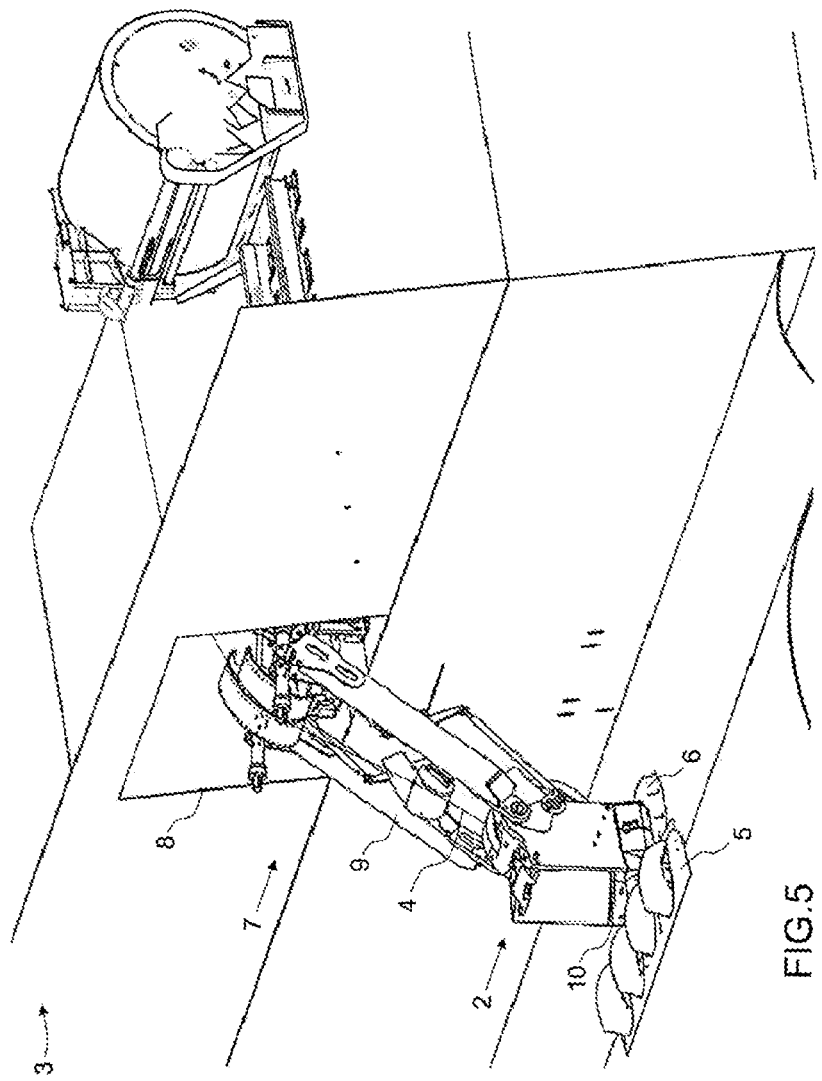

As can be seen in FIG. 5, the handling means 7 can be able to capture the towfish before its entry into the carrier ship 3 and to return it into the carrier ship 3 by making it pass through an opening 8 formed in the hull of the carrier ship 3 or, more generally, to embark it onboard the ship. "Capturing the towfish 2" is understood to mean blocking a movement of the towfish at least on an upward vertical axis with respect to the carrier ship 3. The handling means are embarked onboard the carrier ship 3.

In the nonlimiting embodiment of FIG. 5, the handling means 7 comprise an arm 9 and an end stop 10 passed through by the cable 4 and on which the second body 6 is intended to come to bear when the cable 4 is being paid out so as to prevent a movement of the towfish 6, at least in translation on the axis Z upward with respect to the arm 9, and possibly in rotation about the axis Z with respect to the arm 9. The tension of the cable 4 keeps the second body 6 against the end stop 10.

The end stop 10 comprises, for example, a slit or a hole through which the cable passes. The end stop 10 comprises, for example, two rollers separated by a slit through which the cable 4 passes. The rollers can for example pivot with respect to the arm about an axis which is horizontal when the arm is in the capture position.

Figure 6:
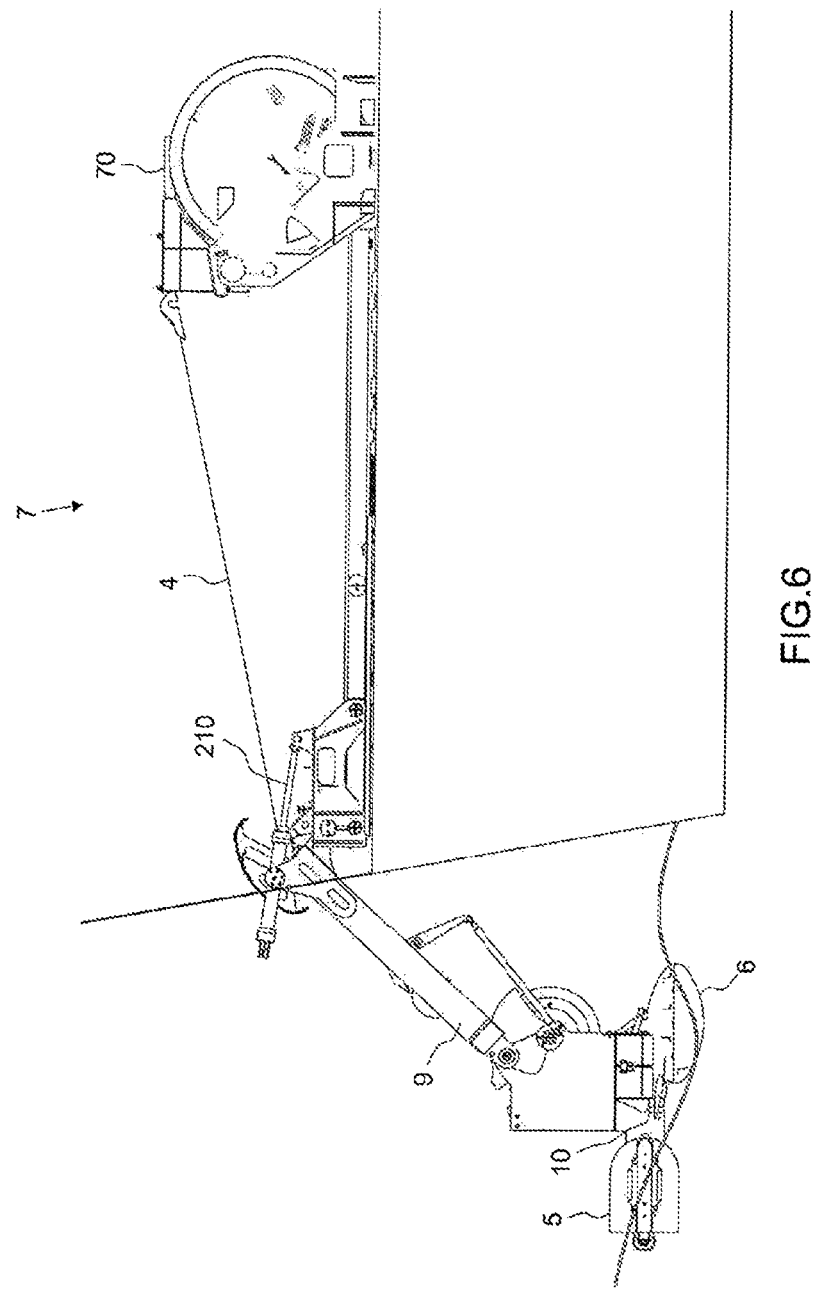
Figure 7:
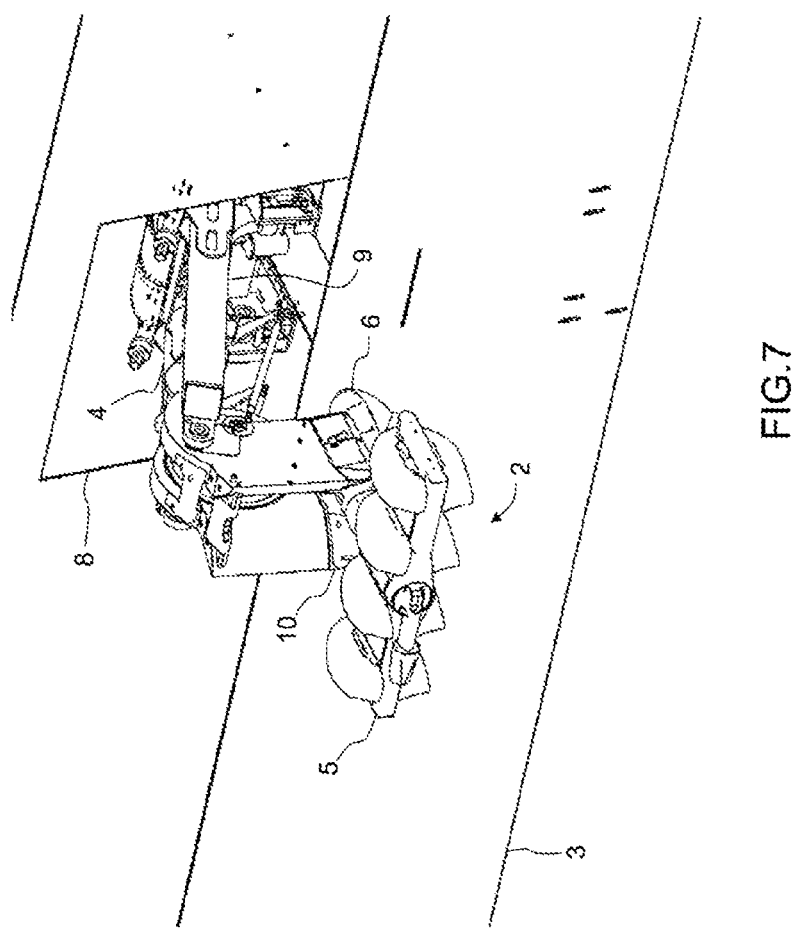

The arm 9 can be held in a capture position that can be seen in FIGS. 5 and 6, in which the end stop 10 extends at a first altitude with respect to the level of the sea, for example substantially at the level of the sea, and in a transfer position, that can be seen in FIG. 7, in which the end stop 10 extends at a greater altitude than in the capture position with respect to the level of the sea. The arm 9 is for example able to swivel with respect to the ship 3 to switch from the transfer position to the capture position and vice versa. The arm 9 switches, for example, from the capture position to the transfer position by rotation with respect to the ship about an axis parallel to Y in calm seas. The sonar system 1 comprises, for example, a first actuator 210 that allows the arm 9 to be made to swivel with respect to a deck of the ship from the capture position to the transfer position and to hold it in these positions.

Figure 8:
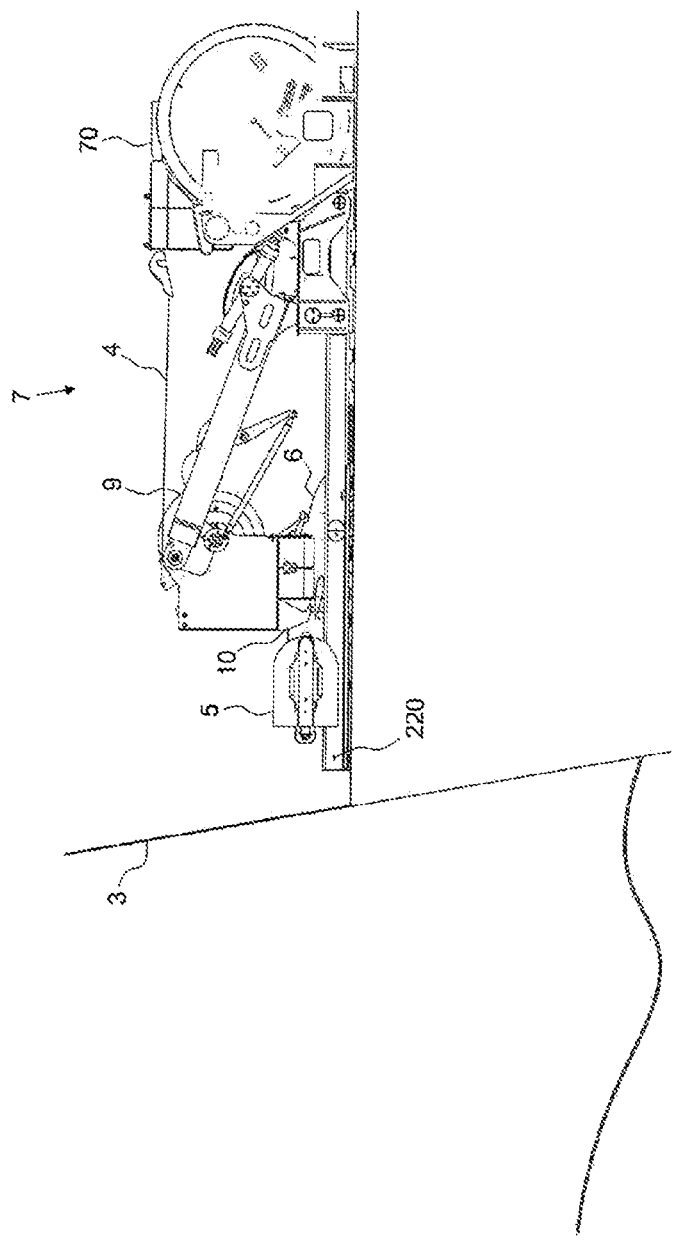

The arm 9 is movable with respect to the ship 3 so as to be able to make the arm switch from the transfer position to a stowage position in which the towfish 2, that can be seen in FIG. 8, in abutment against the end stop 10, is embarked onboard the ship 3.

The switch from transfer position to stowage position is for example obtained by translation of the arm 9 on the longitudinal axis of the carrier ship 3. The sonar system then comprises, for example, a guide 220 that allows the arm to be guided along this axis. The sonar system comprises for example another actuator that allows the switch from the transfer position to the stowage position to be ensured.

The towfish 2 is, for example, embarked onboard the carrier ship 3 by passing through an opening 8 formed in the hull of the ship 3 when the arm 9 switches from the transfer position to the stowage position.

When the first body 5 switches from the capture position before its retrieval, the first body 5 remains almost submerged when the towfish 2 approaches the surface of the water to come to bear against the end stop 10, during the capture phase of the towfish 2 by the handling means 7, which allows the risks of swiveling of the towfish 2 in the vertical plane containing its axis of movement to be limited before the capture since the buoyancy exerted on the towfish 2 remains constant. When the end stop 10 is configured to receive the second body 6, for example, when the end stop 10 has a form substantially complementing that of the second body 6, for example a saddle form, that favors the capture of the towfish 2, the second body 6 of which comes naturally to be placed facing the end stop 10 when the cable 4 is being hauled in. This solution also limits the risks of damage to the transmission antenna which has limited chances of striking the end stop.

The proposed solution is also compatible with a sonar system in which the cable is fixed or linked to the front of the towfish and whose axis of movement is substantially the axis of the part of the cable pulling on the towfish close to the point of fixing of the cable onto the towfish and in which the handling means comprise a winch embarked onboard the ship that allows the cable to be hauled in and paid out and a ramp that is inclined with respect to the horizontal plane situated at the rear of the carrier ship so as to allow the towfish 2 to be embarked onboard the carrier ship 3 by pulling the towfish 2 forward by means of the cable, by hauling in the cable by means of the winch, until the towfish enters into the carrier ship by sliding on the inclined ramp.

The proposed solution also allows the storage of the first body 5 on a drum to be facilitated because its axis is parallel to the axis of rotation of the winch. That also allows the first body 5 to be kept pressing against the winch over the entire length of the first body 5.

As can be seen in FIG. 3, the first body 5 extends longitudinally along the axis I, from a first longitudinal end E1 to a second longitudinal end E2.

Advantageously, as represented in the figures, the axis of rotation is situated substantially equidistant, on the longitudinal axis I, between the two longitudinal ends E1 and E2 of the first body 5. This feature allows the centering of the first body 5 with respect to the second body 6 to be maintained during the switch from the operational position to the capture position which favors the maintaining of a constant trim.

In a variant, the longitudinal axis is at different distances from the two longitudinal ends D1 and D2 along the longitudinal axis I.

Advantageously, the first body 5 is symmetrical with respect to a vertical plane containing the axis of rotation x and with respect to a substantially horizontal plane containing the axis of rotation x, when the totally submerged towfish 2 is towed by the carrier ship 3 and the first body 5 is in the operational position. In other words, the first body 5 is symmetrical with respect to a first plane defined by the longitudinal axis I and the axis of rotation x, in the operational position, and also with respect to a plane containing the axis and at right angles to this first plane. Thus, the first body 5 is also symmetrical with respect to these two planes in the capture position. In other words, the first body 5 is also symmetrical with respect to these two planes, when the totally submerged towfish 2 is towed by the carrier ship 3 and the first body 5 is in the capture position. That makes it possible to create no hydrodynamic imbalance, linked to the drag, during the switch from the capture position to the operational position because the torques induced by the drag do not change. In a variant, the first body is asymmetrical with respect to one of these two planes or with respect to both of these planes.

Advantageously, the center of gravity of the first body 5 is situated on the axis x. The position of this center of gravity is thus unchanged upon the switch from the capture position to the operational position. That makes it possible to create no gravity imbalance upon the switch from the capture position to the operational position. In a variant, the center of gravity of the first body 5 is situated away from the axis x.

Advantageously, the first body 5 comprises a first assembly of at least one tail unit V1, V2 that is vertical, for example having a stabilizing function, when the first body 5 is in the operational position and a second assembly of at least one tail unit H1, H2 that has a horizontal tail unit when the first body 5 occupies the operational position. The first assembly of at least one tail unit V1, V2 has a functional of stabilizing the towfish 2 in yaw and the second assembly of at least one tail unit H1, H2 has a function of stabilizing the towfish 2 in pitch when the first body 5 is in the operational position. Thus, when the first body 5 is in the capture position, the first assembly of at least one tail unit V has a function of stabilizing the towfish 2 in yaw and the second assembly of at least one tail unit has a function of stabilizing the towfish 2 in pitch when the first body 5 is in the operational position. In other words, the tail units retain the tail unit functions in both positions (operational and capture), the vertical tail units in one of the positions becoming horizontal tail units in the other position and vice versa. In a variant, the first body 5 has no vertical tail unit when the first body 5 is in the operational position and/or the first body has no horizontal tail unit when the first body 5 occupies the operational position.

In the embodiment of the figures, as can be seen in FIG. 3, the first body 5 comprises a structure 51, 52 which is vertical in the operational position, the towfish 2 being towed. The structure 51, 52 forms an upper vertical tail unit V2 and a lower vertical tail unit V1 that are coplanar and situated on either side of the axis x. The tail unit V1 is situated on the other side of a horizontal plane containing the axis x with respect to the tail unit V2 and at a depth lower than the tail unit V2, in the operational configuration of FIG. 3.

The tail unit V1 is situated on the other side of a vertical plane containing the axis x with respect to the tail unit in the capture position of FIG. 4.

The tail units V1 and V2 are advantageously arranged so as to be substantially symmetrical to one another with respect to the horizontal plane containing the axis x, in the operational position of FIG. 3 (this plane is also the plane x-y). They are then substantially symmetrical to one another with respect to the vertical plane containing the axis x in the capture position of FIG. 4 (this plane is also the plane x-z). In a variant, the tail units are not symmetrical to one another with respect to the horizontal plane containing the axis x, in the operational position.

The tail units V1 and V2 are advantageously arranged so as to each be substantially symmetrical with respect to the vertical plane containing the axis x, in the operational position of FIG. 3 (this plane is also the plane x-z). They are then each substantially symmetrical with respect to the horizontal plane containing the axis x in the capture position of FIG. 4 (this plane is also the plane x-y). In a variant, at least one of the two tail units is asymmetrical with respect to the vertical plane containing the axis x, in the operational position.

The structure 51, 52 is provided with fairings R comprising a port part Rb and a starboard part Rt (in the operational position of FIG. 3) delimiting the transmitters E and forming protuberances on the tail units V1 and V2. These fairings Rb, Rt fulfil the function of horizontal tail units by their horizontal surfaces H1b, H1t and H2b, H2T.

Each fairing Rb or Rt advantageously comprises tail units H1b, H2b for Rb and H1t, H2t for Rt, these tail units are in the operational position in FIG. 3.

The second body 6 comprises, for example, also wings 61 and 62 that have, for example, a downward lift function when the towing speed increases.

The proposed solution has the advantage of being compatible with a second body of the type of the heavy body represented in FIG. 9. It is not necessary to totally modify the heavy body 102 of FIG. 9 to form therein an opening so that it can house the first body.

The towfish 2 of the proposed solution has a limited length in the two positions (operational and capture), which facilitates its storage onboard the carrier ship.

The invention relates also to a method for retrieving a ship onboard a carrier ship from an initial position in which the towfish 2, totally submerged at an initial depth, is towed by the surface carrier ship and in which the first body occupies the operational position, the method comprising:

a step of rotation of the first body 5 about the axis x to the capture position while the towfish is totally submerged is at a second, lesser depth than the initial depth, followed by a step of raising of the towfish 2 out of the water and a step of embarking the towfish 2 onboard the carrier ship.

Advantageously, the first body 5 is in the captured position during the steps of removal from the water and embarking of the towfish onboard the carrier ship.

Advantageously, the rotation step is implemented when the depth of the towfish no longer allows effective sonar transmission and clearly before passing into the wake of the propellers or of any other propulsion system.

The rotation step is, for example, implemented when the towfish is situated at a depth of between 10 meters and 20 meters.

Advantageously, the method comprises, prior to the rotation step, a step of hauling in of the cable so that the towfish passes from the initial depth to the second depth which is the depth required to perform the rotation.

In the embodiment of the figures, all of the first body 5 is linked to the second body 6 by a single pivot link so that all of the first body 5 is driven in rotation about the axis x with respect to the second body 6.

In a variant, the first body 5 comprises two parts linked to the second body 6 by two distinct pivot links so that these parts can pivot independently of one another with respect to the second body 6 about the axis x.

The cable 4 is advantageously linked to the towfish 2 so that the cable is intended to pull the towfish substantially at a pulling point of the same coordinate as the center of gravity of the towfish 2 on the axis x. That allows a substantially horizontal trim of the towfish to be obtained when the towfish is totally submerged and towed by the carrier ship 3. In a variant, the cable 4 is linked to the towfish 2 so that the cable is intended to pull the towfish substantially at a pulling point away from the center of gravity of the towfish 2 along the axis x.

The cable 4 is advantageously linked to the towfish 2 so that the cable is intended to pull the towfish substantially at a pulling point of the same coordinate as the center of gravity of the towfish 2 on the axis y. In a variant, the cable 4 is linked to the towfish 2 so that the cable is intended to pull the towfish substantially at a pulling point away from the center of gravity of the towfish 2 on the axis y.

The cable 4 is advantageously linked to the towfish 2 so that the cable is intended to pull the towfish substantially at a pulling point intended to be at a lower depth than that of the center of gravity of the towfish when the towfish 3 is towed by the ship 3 and totally submerged. That allows a certain roll return torque to be obtained so as to obtain a zero list and participate in obtaining a substantially horizontal trim. In a variant, the pulling point is intended to be at a greater depth or a depth equal to that of the center of gravity of the towfish when the towfish 3 is towed by the ship 3 and totally submerged.

The invention claimed is:

1. A sonar system comprising:
a towfish comprising a first body linked to a second body, the first body being elongate along a longitudinal axis and comprising a plurality of acoustic transmitters distributed along the longitudinal axis,
the sonar system further comprising a cable linked to the second body and via which a surface carrier ship is configured to tow the towfish, the first body being mounted to pivot, with respect to the second body, about an axis of rotation so that, the first body can switch, by pivoting with respect to the second body about the axis of rotation, from an operational position to a capture position; the axis of rotation being substantially an axis of movement of the towfish, the longitudinal axis being substantially vertical in the operational position of the first body and being substantially horizontal in the capture position of the first body, when the towfish is totally submerged and towed by the carrier ship.

2. The sonar system as claimed in claim 1, wherein the axis of rotation extends substantially horizontally when the towfish is towed by the carrier ship.

3. The sonar system as claimed in claim 1, wherein the cable is linked to the second body so that the cable pulls the towfish from above the second body.

4. The sonar system as claimed in claim 1, wherein the axis of rotation is situated substantially equidistant between two longitudinal ends of the first body.

5. The sonar system as claimed in claim 1, wherein the first body is substantially symmetrical with respect to the vertical plane containing the axis of rotation and the cable and with respect to a substantially horizontal plane containing the axis of rotation, when the towfish is towed by the carrier ship and the first body is in the operational position.

6. The sonar system as claimed in claim 1, wherein a center of gravity of the first body is situated on the axis of rotation.

7. The sonar system as claimed in claim 1, wherein the first body comprises a first assembly of at least one tail unit that is vertical and that has a stabilizer function when the first body is in the operational position and at least one second assembly of at least one tail unit that is horizontal when the first body is in the operational position.

8. The sonar system as claimed in claim 1, wherein the towfish has a negative buoyancy.

9. The sonar system as claimed in claim 1, comprising handling means comprising a winch allowing the cable to be pulled in and paid out and an arm comprising an end provided with an end stop, the arm being able to be maintained in a receiving position with respect to the carrier ship, wherein the end stop is situated above the surface of the water at a first height with respect to the surface of the water, the end stop being passed through by the cable so that the second body can come to bear on the end stop when the cable is hauled in so as to block the upward movement of the second body with respect to the arm, the arm being movable with respect to the carrier ship so as to be able to be in a stowage position with respect to the carrier ship wherein the towfish is embarked onboard the carrier ship, the second body being in abutment against the end stop.

10. The sonar system as claimed in claim 1, comprising the carrier ship.

* * * * *